(12) United States Patent  (10) Patent No.: US 8,516,284 B2
Chan et al.  (45) Date of Patent: Aug. 20, 2013

(54) SAVING POWER BY PLACING INACTIVE COMPUTING DEVICES IN OPTIMIZED CONFIGURATION CORRESPONDING TO A SPECIFIC CONSTRAINT

(75) Inventors: Hoi Y. Chan, Stamford, CT (US); Rajarshi Das, New Rochelle, NY (US); James E. Hanson, Yorktown Heights, NY (US); Canturk Isci, West New York, NY (US); Jeffrey O. Kephart, Cortlandt Manor, NY (US); David W. Levine, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/939,635

(22) Filed: Nov. 4, 2010

(65) Prior Publication Data

US 2012/0117399 A1 May 10, 2012

(51) Int. Cl.
*G06F 1/26* (2006.01)
*G06F 1/32* (2006.01)

(52) U.S. Cl.
USPC .......................... 713/320; 713/324

(58) Field of Classification Search
USPC ................. 713/320, 323, 324, 340
See application file for complete search history.

(56) References Cited

U.S. PATENT DOCUMENTS

| | | | |
|---|---|---|---|
| 5,283,905 A | 2/1994 | Saadeh et al. | |
| 5,506,987 A | 4/1996 | Abramson et al. | |
| 5,692,204 A | 11/1997 | Rawson et al. | |
| 5,761,507 A | 6/1998 | Govett | |
| 5,872,972 A | 2/1999 | Boland et al. | |

(Continued)

FOREIGN PATENT DOCUMENTS

| | | |
|---|---|---|
| JP | 2005367416 | 12/2005 |
| JP | 2006195986 | 7/2006 |

OTHER PUBLICATIONS

Standard Performance Evaluation Corporation, last updated Jul. 15, 2010, Copyright 1995-2010, http://www.spec.org/power_ssj2008.

(Continued)

*Primary Examiner* — Thomas Lee
*Assistant Examiner* — Phil Nguyen
(74) *Attorney, Agent, or Firm* — Scully, Scott, Murphy & Presser, P.C.; Preston J. Young, Esq.

(57) ABSTRACT

A system method and computer program product for managing readiness states of a plurality of computing devices. A programmed processor unit operates, upon receipt of a request, to either: provide one or more computing devices from an inactive pool to an active pool, or accept one or more active computing devices into the inactive pool. An Inactive Pool Manager proactively manages the inactive states of each computing device by: determining the desired number (and identities) of computing devices to be placed in each inactive state of readiness by solving a constraint optimization problem that describes a user-specified trade-off between expected readiness (estimated time to be able to activate computing devices when they are needed next) and conserving energy; generating a plan for changing the current set of inactive states to the desired set; and, executing the plan. Multiple alternative ways of quantifying the desired responsiveness to surges in demand are provided, and, in each case, the tradeoff between responsiveness and power savings is formulated as an objective function with constraints, and the desired number of devices in each inactive state emerges as the solution to a constraint optimization problem.

12 Claims, 8 Drawing Sheets

(56) References Cited

U.S. PATENT DOCUMENTS

| | | | |
|---|---|---|---|
| 6,161,173 A * | 12/2000 | Krishna et al. | 712/214 |
| 6,324,580 B1 | 11/2001 | Jindal et al. | |
| 6,771,661 B1 | 8/2004 | Chawla et al. | |
| 6,795,928 B2 * | 9/2004 | Bradley et al. | 713/320 |
| 6,816,905 B1 | 11/2004 | Sheets et al. | |
| 6,859,882 B2 | 2/2005 | Fung | |
| 6,996,728 B2 | 2/2006 | Singh | |
| 7,051,215 B2 | 5/2006 | Zimmer et al. | |
| 7,058,826 B2 | 6/2006 | Fung | |
| 7,124,321 B2 | 10/2006 | Garnett et al. | |
| 7,143,300 B2 | 11/2006 | Potter et al. | |
| 7,174,468 B2 | 2/2007 | Gary et al. | |
| 7,210,145 B2 | 4/2007 | Srinivasan | |
| 7,219,249 B1 | 5/2007 | Ghose et al. | |
| 7,228,441 B2 | 6/2007 | Fung | |
| 7,272,735 B2 | 9/2007 | Fung | |
| 7,337,333 B2 | 2/2008 | O'Conner et al. | |
| 7,441,135 B1 | 10/2008 | Chan et al. | |
| 7,797,563 B1 * | 9/2010 | Moll et al. | 713/324 |
| 2002/0004913 A1 * | 1/2002 | Fung | 713/300 |
| 2002/0004915 A1 | 1/2002 | Fung | |
| 2003/0037268 A1 | 2/2003 | Kistler | |
| 2003/0056126 A1 | 3/2003 | O'Connor et al. | |
| 2003/0120751 A1 | 6/2003 | Husain et al. | |
| 2003/0158940 A1 | 8/2003 | Leigh | |
| 2003/0204759 A1 | 10/2003 | Singh | |
| 2004/0015581 A1 | 1/2004 | Forbes | |
| 2004/0034807 A1 | 2/2004 | Rostowfske | |
| 2005/0050200 A1 | 3/2005 | Mizoguchi | |
| 2005/0149940 A1 | 7/2005 | Calinescu et al. | |
| 2005/0165925 A1 | 7/2005 | Dan et al. | |
| 2005/0182838 A1 | 8/2005 | Sheets et al. | |
| 2005/0188075 A1 | 8/2005 | Dias et al. | |
| 2006/0168104 A1 | 7/2006 | Shimizu et al. | |
| 2006/0265616 A1 | 11/2006 | Cesare et al. | |
| 2007/0043860 A1 | 2/2007 | Pabari | |
| 2007/0049133 A1 * | 3/2007 | Conroy et al. | 439/894 |
| 2007/0130341 A1 * | 6/2007 | Ma | 709/226 |
| 2007/0276934 A1 | 11/2007 | Lai | |
| 2008/0126816 A1 * | 5/2008 | Prete et al. | 713/323 |
| 2009/0235097 A1 | 9/2009 | Hamilton et al. | |
| 2010/0218005 A1 * | 8/2010 | Jain et al. | 713/300 |

OTHER PUBLICATIONS

Deusterwald, E., et al., "Characterizing and Predicting Program Behavior and its Variability", Proceedings of the 12th International Conference on Parallel Architectures and Compilation Techniques, Sep. 27-Oct. 1, 2003, p. 220, Abstract only.

Benini, L., "Policy optimization for dynamic power management,"; Computer-Aided Design of Integrated Circuits and Systems, IEEE Transactions, Publication Date: Jun. 1999, vol. 18, Issue: 6, pp. 813-833, INSPEC Accession No. 6270844. Digital Object Identifier: 10.1109/43.766730. Posted online: Aug. 6, 2002 22:29:34.0 http://ieeexplore.ieee.org/xpl/RecentIssue.jsp?punumber=43 http://ieeexplore.ieee.org/xpl/tocresult.jsp?isnumber=16613 &isYear=1999.

Chase, J., et al., "Balance of Power: Energy Management for Server Clusters," Proceedings of the 8th Workshop on Hot Topics in Operating (2001). http:// citeseer.ist.psu.edu. http://www.cs.duke.edu/ari/publications/publications.html, Jan. 2001.

Nishimura, F., "Transaction Modes of Electric Energy Exchange and their Effects on Benefit Optimization and Allocation,"Conference: Energy management and power delivery—International conference, EMPD-Proceedings- , 1995; vol. 1 , p. 25-30, Publisher: Piscataway, NJ.

Srivastava, M.B., et al., "Predictive system shutdown and other architectural techniques for energy efficient programmable computation," Very Large Scale Integration (VLSI) Systems, IEEE Transactions, Publication Date: Mar. 1996, pp. 42-55, vol. 4, Issue: 1.

Tiwari, V., et al., "Guarded evaluation: pushing power management to logic synthesis/design," International Symposium on Low Power Electronics and Design, Proceedings of the 1995 international symposium on Low power design, 1995, pp. 221-226.

Zheng, R., et al., "On-demand power management for ad hoc networks," in: Ad Hoc Networks, Jan. 2005, pp. 51-68, vol. 3, Issue 1.

* cited by examiner

| Initial State \ Final State | ACTIVE | IDLE | STANDBY | HIBERNATE | SHUTDOWN PREPARED | SHUTDOWN BARE | SHUTDOWN TEARDOWN |
|---|---|---|---|---|---|---|---|
| ACTIVE | 0 | $10^{-3}$ | 10 | 100 | 300 | 400 | 600 |
| IDLE | $10^{-3}$ | 0 | 10 | 100 | 300 | 400 | 600 |
| STANDBY | 12 | 12 | 0 | 110 | 310 | 410 | 610 |
| HIBERNATE | 120 | 120 | 130 | 0 | 420 | 520 | 720 |
| SHUTDOWN PREPARED | 400 | 400 | 410 | 500 | 0 | 800 | 1000 |
| SHUTDOWN BARE | 600 | 600 | 610 | 700 | 900 | 0 | 1200 |
| SHUTDOWN TEARDOWN | 720 | 720 | 730 | 820 | 1020 | 1120 | 0 |

FIG. 3B

| Initial State \ Final State | ACTIVE | IDLE | STANDBY | HIBERNATE | SHUTDOWN PREPARED | SHUTDOWN BARE | SHUTDOWN TEARDOWN |
|---|---|---|---|---|---|---|---|
| ACTIVE | 0 | 250 | 200 | 220 | 250 | 250 | 250 |
| IDLE | 250 | 0 | 200 | 220 | 250 | 250 | 250 |
| STANDBY | 200 | 200 | 0 | 240 | 250 | 250 | 250 |
| HIBERNATE | 220 | 220 | 240 | 0 | 250 | 250 | 250 |
| SHUTDOWN PREPARED | 250 | 250 | 250 | 250 | 0 | 250 | 250 |
| SHUTDOWN BARE | 250 | 250 | 250 | 250 | 250 | 0 | 250 |
| SHUTDOWN TEARDOWN | 250 | 250 | 250 | 250 | 250 | 250 | 0 |

SAVING POWER BY PLACING INACTIVE COMPUTING DEVICES IN OPTIMIZED CONFIGURATION CORRESPONDING TO A SPECIFIC CONSTRAINT

FIELD OF INVENTION

The present invention relates generally to power management techniques for computing systems, such as server farms or clusters in data centers, for instance.

BACKGROUND

The cost of data center server power consumption and the cooling systems to dissipate the generated heat are major expenses in modern data centers where thousands of servers are densely packed in relatively small racks. To maintain effective operation and sustain profitability, it becomes necessary to have power management systems to optimize the power usage with respect to customer requirements. In other words, these power management systems must be able to use minimum power possible and yet be able to satisfy all customer requirements. It is well established that a typical server consumes a relatively high amount of power even it is idle, due to chip leakage current and other supporting components such as disk drives and network routers. Turning a system off and directing all traffic to a subset of available servers during non-peak hours is a common approach to saving power during periods of low traffic. Current technologies for server shutdown are mainly based on manual actions by system administrators or on automated actions driven by simple policies. Based on their experiences and workload history, the system operators may shut down systems for an extended period of time. In doing so, these system operators must anticipate the possibility of sudden increases in traffic, and often they drastically overprovision to ensure adequate performance (and hence customer satisfaction) even under worst case situations. The amount of manual effort by system administrators is costly, and so is the over provisioning that is typically done to ensure that performance goals are met— particularly as energy costs continue to mount.

New power management strategies that turn servers on and off in real time as workload fluctuates have been investigated. While turning a server off can save energy costs, and perhaps licensing fees as well, a countervailing factor that must be considered is the cost of turning a server on or off. There are several components to this cost. First, during the time that a server is being powered down or up, it is still consuming energy but is not doing any useful work. Second, every time a server is power-cycled, the thermal changes induce more wear and tear on the server, and thus frequent cycling may shorten the lifetime of the server, leading to an increased failure rate and a concomitant increase in replacement cost. Third, 1 to 5 minutes may elapse when restoring a server from shut-down state to a state in which it is fully available for use, depending on system applications and configurations. This may not be fast enough to react to a sudden increase in traffic, resulting in Service Level Agreements (SLA) violations, which may be subject to monetary penalties. All of these problematic costs reduce the usefulness of the strategy of turning servers on and off dynamically, preventing power management strategies of this nature from being deployed widely.

It is therefore desirable to place these unneeded devices into intermediate states of "readiness" such as "standby" or "hibernate" from which the devices may be activated more quickly. These states consume more power than when the device is powered down, and generally have longer activation times than the idle state. Moreover, as common in data center environments with distributed resources, the overall infrastructure is generally composed of different physical components with different power-performance characteristics, different power management capabilities and different power-state-transition latencies. Therefore, the overall system efficiency can vary dramatically by the order which the hosts are chosen to transition into different power states.

At present, there are no algorithms known in the art for managing these tradeoffs between the desire to conserve energy and the desire to be responsive to surges in workload behavior.

SUMMARY

The present invention is a system, method and computer program product that addresses the tradeoff between responsiveness and power savings by coordinating multiple surge response zones in a computing cluster with different power-management states system characteristics.

In one embodiment, the tradeoffs between responsiveness and power savings are formulated as an objective function with constraints, and the desired number of devices in each inactive state emerging as the solution to a constraint optimization problem.

Thus, in one aspect, there is provided a system, method and computer program product for managing power consumption in a system comprising computing devices. The method comprises: receiving, at a processing unit, a request to one of: activate or deactivate one or more computing devices from a respective group of inactive or active computing devices, each inactive or active computing device initially in a pre-determined state of readiness; activating or deactivating the one or more computing devices, the activating or deactivating resulting in a number of computing devices in one or more states of readiness i; optimizing configuration of the computing devices in the one or more states of readiness i by minimizing an expected power consumption $\Sigma_i A_i P_i$ where i represents all inactive computing devices, $A_i$ represents a number of the computing devices currently in each state i, and, $P_i$ represents an average power consumption of a computing devices while in the state i; and placing the computing devices in the optimized configuration. A program using the processor unit is configured to perform one or more of the receiving, activating, optimizing and placing.

Further to this aspect, there are defined multiple alternative ways of quantifying the desired responsiveness to surges in demand and, in each case, formulating tradeoffs between responsiveness and power savings as an objective function with constraints, and the desired number of devices in each inactive state emerges as the solution to a constraint optimization problem.

Thus, the method further comprises: formulating, for processing by said processor unit, a constraint optimization problem including an objective function with constraints representing respective tradeoffs between transition time responsiveness and power savings; and, solving said constraint optimization problem to determine a number of devices to be placed in each inactive state of readiness.

In a further aspect, there is provided a system for managing inactive states of computing devices comprising: receiving, at a processing unit, a request to one of: activate or deactivate one or more computing devices from a respective group of inactive or active computing devices, each inactive or active computing device initially in a pre-determined state of readiness; activating or deactivating the one or more computing devices, the activating or deactivating resulting in a number of computing devices in one or more states of readiness i; optimizing configuration of the computing devices in the one or more states of readiness i by minimizing an expected power consumption $\Sigma_i A_i P_i$ where i represents all inactive computing devices, $A_i$ represents a number of the computing devices currently in each state i, and, $P_i$ represents an average power consumption of a computing devices while in the state i; and placing the computing devices in the optimized configuration. A program using the processor unit is configured to perform one or more of the receiving, activating, optimizing and placing.

A computer program product is provided for performing operations. The computer program product includes a storage medium readable by a processing circuit and storing instructions run by the processing circuit for running a method. The method is the same as listed above.

Further, in accordance with one embodiment, provision is made for permitting human involvement in the decision regarding which devices are to be placed in which state.

Advantageously, in one aspect, there is provided an effective and efficient dynamic server buffering system for optimizing power consumption in servers while adhering to specified Service Level Agreements (SLAs).

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

In one aspect, there is provided a system, method and computer program product for providing automated power management techniques for computing systems, generally, and more particularly, the invention relates to an effective and efficient dynamic server buffering system for optimizing power consumption in servers according to specified constraints. In one embodiment, power consumption optimization adheres to specified Service Level Agreements (SLAs).

Further, the system, method and computer program product provides automated power management and addresses the tradeoff between responsiveness and power savings by coordinating multiple surge response zones in a computing cluster with different power-management states system characteristics. In one embodiment, the tradeoffs between responsiveness and power savings are formulated as an objective function with constraints, and the desired number of devices in each inactive state emerging as the solution to a constraint optimization problem.

Figure 1:
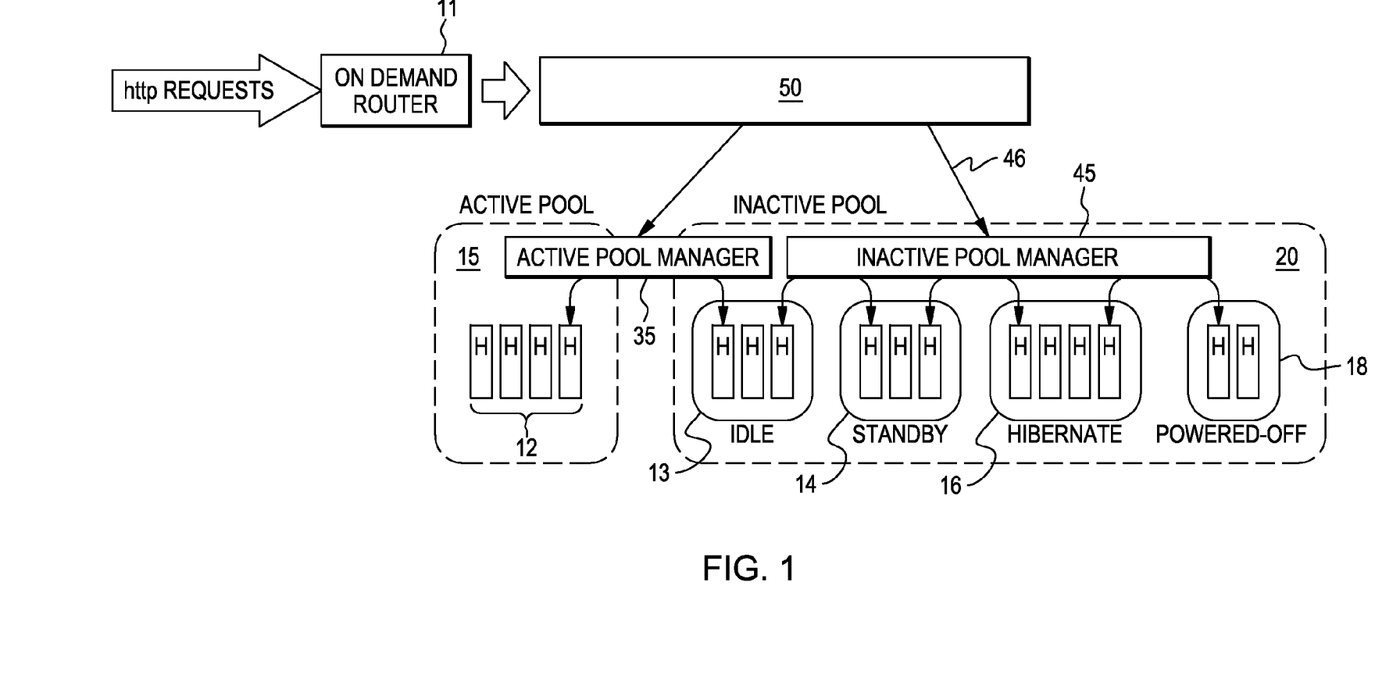
FIG. 1 depicts an exemplary overview of the global manager with the active and inactive pool managers for four inactive power states.

FIG. 1 illustrates an environment, e.g., a data center, or computing cluster 10, in which the power management system and method of the invention may be employed. As shown in FIG. 1, the system includes: an on-Demand Router 11 that receives service requests, e.g., http requests, from clients (not shown), e.g., over a communications network; a pool 15 of active, powered-on computing devices 12 that provide the required computing resources for the current level of workload demand; a pool 20 of inactive computing devices 13 that are unemployed under a current resource demand level; and a Performance or Global Manager device 50 which is a computing device, including a processor unit, operable for controlling the power settings of each of the servers 12 in the Active Servers Pool 15 via Active Pool Manager device 35, and, the deployment of servers from the Inactive Servers Pool 20 to the Active Servers Pool 15 via Inactive Pool Manager device 45 (or, removal of servers from the Active Servers Pool 15 for placement back in the Inactive Servers Pool 20).

FIG. 1 particularly shows a computing cluster 10 with multiple computing devices 12, e.g., servers, workstations, and a distributed workload such that, at any given time instance: pool 15 includes active, powered-on computing devices 12 that provide the required computing resources for the current level of workload demand, and pool 20 includes inactive computing devices 13 that are unemployed under a current resource demand level. The computing resources, e.g., server devices, in pool 20 are in various states of inactivity, e.g.,—at least two—distinct inactive states, such as "idle" state 13, "standby" state 14, "hibernate" state 16 and "powered-off" state 18, into which inactive devices may be placed.

In one exemplary embodiment, the Inactive Pool Manager device 45 manages the inactive states of all computing devices in the inactive pool. The Global Manager device 50 manages the interaction of the "Active Pool Manager" device 35 and "Inactive Pool Manager" device 45. For example, the global manager device 50 interfaces with the "Active Pool Manager" device 35 that executes logic configured for determining when computing devices should be activated from the inactive pool, or returned to the inactive pool; and, further interfaces with the "Inactive Pool Manager" device 45 that executes logic configured for dividing the inactive resources into different "inactive zones" operating at the different inactive states and for determining the transition of inactive devices among the different states.

In one embodiment, the Inactive Pool Manager device 45 receives request 46 from the Global Manager device 50, e.g., a request from the Global Manager to either provide one or more computing devices from the inactive pool to the active pool, or accept one or more active computing devices into the inactive pool. If the request was to activate computing devices, the Inactive Pool Manager 45 selects which servers to provide, and takes steps to activate them. If the request is to accept computing devices into the inactive pool, the Inactive Pool Manager device de-activates one or more computing devices to an initial inactive state. Therefore, the "Inactive Pool Manager" that plans the activation transition and the transition(s) of inactive device(s) among the different inactive states (between inactive state transitions) is generally referred to herein as a "planner" device.

Once satisfying the Global Manager's request, the Inactive Pool Manager 45 proactively manages the inactive states of each computing device as follows: 1) by determining the desired number (and identities) of computing devices to be placed in each inactive state by solving a constraint optimization problem that describes a user-specified trade-off between expected readiness (estimated time to be able to activate computing devices when they are needed next) and conserving energy; 2) by generating a plan for changing the current set of inactive states to the desired set; and, by 3) executing the plan.

The abovementioned embodiment can be described more specifically in terms of the following set of quantities:

a set of activation states (e.g. active, idle, standby, hibernate, shutdown-bare, . . . );

an activation vector $A_i$, representing the number of servers currently or prospectively in each activation state i;

a transition latency matrix $T_{ij}$, representing the expected time required to change the activation state of a server from i to j;

a power vector $P_i$, representing the average power consumption of a server while in activation state i;

a readiness vector R, where the $k^{th}$ component $R_k$ represents the minimal amount of time it would take for k inactive servers to be restored to an active state given a specific activation vector A and the transition latency matrix T; and a desired readiness vector $R^0$, where the kth component $R^0_k$ represents a specified constraint on the maximum time permitted for k inactive servers to be restored to an active state.

With reference to these defined quantities, a method of managing the inactive server pool in accordance with this embodiment is depicted by the flow chart in FIG. 5, as follows. In the method 100, it is given that, as depicted at step 105, the performance manager, i.e., Global Manager device 50 initiates an activation or a deactivation request. If the request is for activation, control passes to step 112, at which the performance manager generates an activation request to the Inactive Pool Manager (IPM) to activate the quantity of "k" servers. The number of servers to be activated, k, may be chosen according to a number of criteria or rules, typically for the purpose of providing a desired level of performance (e.g., as governed by an SLA between parties). At step 114, the IPM identifies the k most ready servers from the activation vector A, i.e. those for which the corresponding transition latencies are the least. Then, at step 116, the servers identified at step 114 are brought to the active state to satisfy the performance manager. Control then passes to step 130 where the IPM computes the resulting activation vector A'. On the other hand, if at step 105, the Global Manager device 50 decides to initiate a deactivation request, it specifies (at step 122) a set of k active servers that are to be deactivated, and moved from the active pool 15 into the inactive pool 20. Control then passes to step 124, at which point the k active servers identified by the Global Pool Manager device are placed in a chosen inactive state in the inactive pool. Control then passes to step 130.

Regardless of whether servers have been activated or deactivated, at step 130 a new activation vector A' is computed by the IPM. In one embodiment, before computing new activation vector A', one approach is to wait until the activation steps undertaken at step 116 or the de-activation steps undertaken at step 124 have completed, and observe how many servers are in each inactive state to derive A'. A second approach is to anticipate what the activation vector will be when steps 116 or 124 have completed, which is computed from the original activation vector A and a knowledge of which servers are making transitions and their original and destination states.

From step 130, control then passes to step 140, at which an optimal activation vector A" is computed. In this preferred embodiment, a constraint-optimization problem is formulated and solved to generate A". One example of such a constraint-optimization problem is to select A" so as to minimize the expected power consumption $\Sigma_i A_i P_i$ (where the index i runs across all inactive servers) subject to the constraint that $R_k \leq R^0_k$ for all k. The solution can be computed by any of a number of existing constraint-optimization techniques known in the art, ranging from methods such as exhaustive search to ones such as are embodied in the known CPLEX® (Trademark of CPLEX Optimization Inc., TEXAS) optimization software package.

Figure 5:
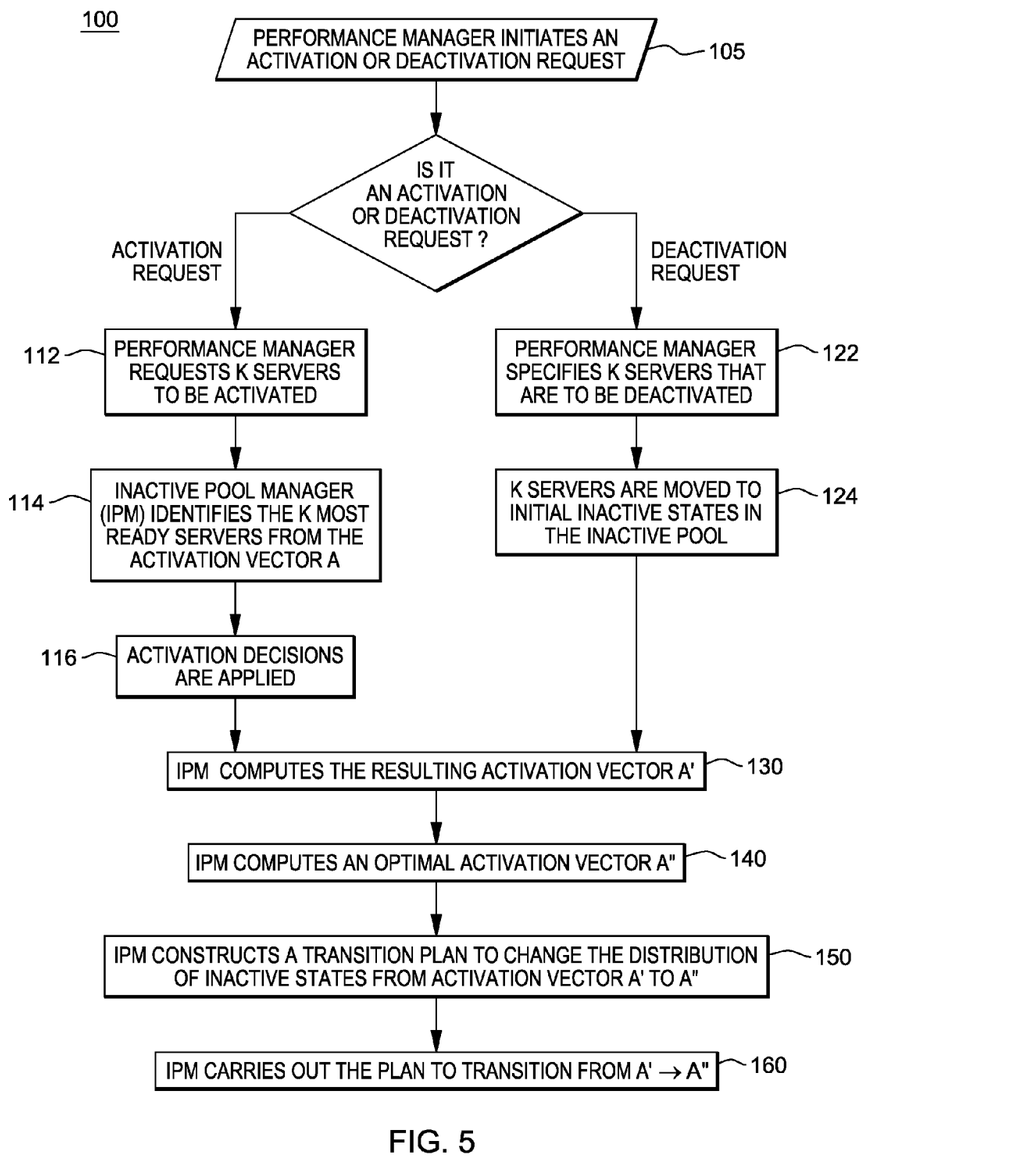
FIG. 5 depicts a method of managing the inactive server pool in one embodiment.

Next, as shown in FIG. 5, control passes to step 150, at which the IPM generates a plan consisting of a sequence of actions required to move the system from activation A' to activation A". In one embodiment, these actions are performed in parallel. These actions include transitioning servers from one inactive state to another to reach the desired power state for each server. In one example implementation, the method comprises computing a generated plan as that which minimizes the time required to accomplish the switch from A' to A", as may be computed using the transition latency matrix T.

Finally, control passes to Step 160, at which the transition plan generated at step 150 is executed, bringing the system to activation state A".

As an explicit example in accordance with the first embodiment, a device 12, e.g., a server, in the cluster may be in one of the following activation states with respect to a given application or set of applications that are intended to run on that server: 0) active mode, in which it is fully on and operational and processing workload; 1) idle mode, in which the server is idle but ready to accept workload nearly instantaneously; 2) standby mode, in which the server architectural state is saved in memory and the processors and part of the system are put into low-power state; 3) hibernate mode, in which the server architectural and memory state are saved into disk, and various components of the server such as the memory and CPU are in low power consumption mode; and, 4) shutdown-prepared mode, in which all components are completely powered down but the operating system, middleware and software needed by the application are loaded on the server. Servers may even be in any of several less-prepared states of readiness with respect to the application(s) of interest. For example, the server may be in a 5) shutdown-bare mode, in which it is necessary to install some combination of the operating system, hypervisor, middleware, and/or software on the server (either by installing them via traditional methods or by loading a virtual machine image) before it is able to run the application of interest, or a 6) shutdown-teardown mode, in which the server needs to have its current software, middleware and operating system removed before it is ready to be re-provisioned with the appropriate operating system, software and middleware.

Given the aforementioned definition of the server activation states, in an illustrative example, supposing that there are 2 active servers and 6 inactive servers (1 in idle mode, 1 in standby mode, 1 in hibernate mode, 1 in shutdown-prepared mode, and 2 in shutdown-bare mode), the activation vector A would be represented as:

$A_0=2$
$A_1=1$
$A_2=1$
$A_3=1$
$A_4=1$
$A_5=2$
$A_6=0$

Or, more compactly, A=(2,1,1,1,1,2,0).

Figure 3A:
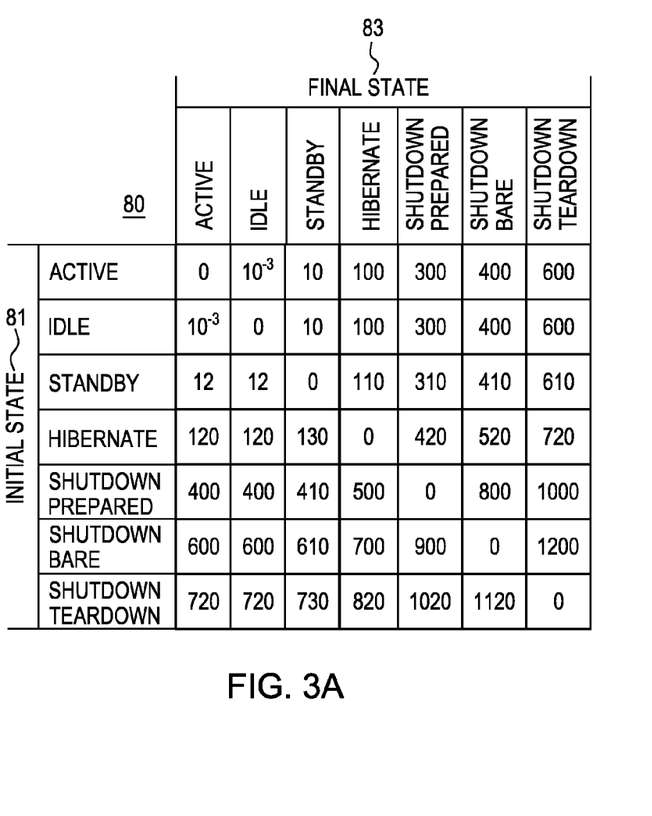
FIG. 3A and FIG. 3B depict depicts example Resource descriptors for an example computing device: a Transition latency matrix resource descriptor 80, and a transition power matrix resource descriptor 90.

Continuing this example, consider a transition latency matrix 80 as given in FIG. 3A. The average transition latency $T_{ij}$ associated with each pair of readiness states i and j may be known a priori, or may be established with a calibration process to be described herein below in greater detail. In the example transition latency matrix 80 of FIG. 3A, the transition to the active state takes $10^{-3}$ seconds from the idle state, 12 seconds from standby, 120 seconds from hibernate, 400 seconds from shutdown-prepared, 600 seconds from shutdown-bare, and 720 seconds from shutdown-teardown.

Furthermore, for this example, suppose that the expected average power consumption in the various states is $P_6$=5 watts
$P_5$=5 watts
$P_4$=5 watts
$P_3$=10 watts
$P_2$=20 watts
$P_1$=50 watts
$P_0$=150 watts Or, more compactly, P=(150,50,20,10,5,5,5).

Continuing the example further, a user may specify a desired state of readiness via the desired readiness vector $R^0$. For example, an administrator or an automated entity such as a workload manager determines that, given the historical volatility of a given workload, it is advisable for it to take no more than 5 seconds for a single inactive server to be brought to the active state, no more than 30 seconds for two servers to be brought to the active state, and no more than 180 seconds for three servers, no more than 400 seconds for four servers, no more than 600 seconds for five servers, and no restrictions on how long it can take for 6 or more servers to be brought back to the active state in the event of a sudden surge in workload. Then the administrator or workload management software uses an interface to set the desired readiness vector to the values $R^0$=(5, 30, 180, 400, 600), with $R^0$k set to infinity for k>5.

In this embodiment, the constraint optimization problem is to compute the activation vector A such that:

the actual readiness vector R will not exceed $R^0$ in any component, i.e. $R_k \leq R^0_k$ for all k; and the expected aggregate power consumption for activation vector A, $\Sigma_i A_i P_i$, is minimized (the summation index range need not include the active state i=0, although whether or not it does is immaterial because the active state manager will already have determined $A_0$, so all possible solutions will share the same value for it.).

Note that the $k^{th}$ component of the actual readiness vector R of any given activation vector A can be computed as the expected time for k inactive servers to be placed in the active state, provided that the most efficient route to activation is taken in terms of server transition latencies. Thus $R_k$ is computable from the activation vector A, the transition latency matrix T, and certain knowledge about whether servers can be activated serially or in parallel. For example, suppose the A is given as above: A=(2,1,1,1,1,2,0), T is given as in FIG. 3A, and servers may be activated in parallel. Then $R_1$=$10^{-3}$ seconds because that is the time required to place the server in standby mode in active mode. $R_2$=12 seconds, because creating two active servers requires that the first server be activated from idle mode, which takes $10^{-3}$ seconds, and the second server must be activated from standby mode, which takes 12 seconds. If the two servers can be activated in parallel, the total time required to make two servers active is 12 seconds. Similarly, one can compute $R_3$=120 seconds, $R_4$=400 seconds, and $R_5$=$R_6$=600 seconds if it is assumed that the two servers in shutdown-bare mode could be activated in parallel in one embodiment. For k>6, $R_k$ is infinite because there are no additional servers available in the inactive pool to satisfy a higher k. Thus, for the activation vector A=(2,1,1,1,1,2,0), R=(10-3, 12, 120, 400, 600, 600), with $R_k$ infinite for k>6. Comparing the computed readiness R vector with the desired readiness vector $R^0$=(5, 30, 180, 400, 600), it is found that the constraint $R_k \leq R^0_k$ is satisfied for all k. Thus this activation vector would satisfy the constraint. The corresponding total power consumption of the inactive pool is 50+20+10+5+2*5+0*5=95 watts in this example.

In order to determine the optimal activation vector among all for which the number of inactive servers is equal to the current number of inactive servers, an exhaustive search is conducted over all possible activation vectors to find the one that minimizes the total power consumption of the inactive pool while satisfying the readiness vector constraint, or use any of a number of more sophisticated constraint optimization methods such as are embodied in the known CPLEX optimization software package. In this example, it turns out that A=(2,1,1,1,1,2,0) is the optimal activation vector.

In alternate embodiments, the method is substantially similar to the first embodiment, except that the desired readiness is described in a manner other than as a specified constraint on the maximum time permitted for k inactive servers to be restored to an active state. An important class of such alternate embodiments is one for which the first embodiment is preceded with a step in which the alternate way of expressing desired readiness is translated into the aforementioned desired readiness vector $R^0$. For example, in a second embodiment, in lieu of the readiness vector $R^0$, a desired demand fluctuation response vector $F^0$ is provided, such that the $k^{th}$ component $F^0_k$ represents the maximum time permitted for a plurality of servers to be allocated so as to provide acceptable performance should the workload intensity increase by a fraction $g_k \leq g \leq g_{k+1}$ above its present level. The workload intensity may be expressed in terms of number of clients, number of requests per second, or any other suitable metric. The fractions $g_k$ may be set to any values, but are preferentially set such that the lowest value $g_0$ is set to zero and the highest value is set to infinity so that the full range of possible rises in demand can be covered. An example is provided in the table below, which can equivalently be expressed as $F^0$=(0, 15, 120, 400, 600, 720, ∞) and g=(0, 0.1, 0.2, 0.3, 0.5, 0.8, ∞). As summarized in TABLE 1 below, the interpretation is that a workload increase of up to 10% above the present level must be handled immediately without violating acceptable limits on performance; a workload increase of 10-20% above the present level must be handled acceptably within 15 seconds, a workload increase of 20-30% must be handled acceptably within 120 seconds, and so on, up to the final requirement that a workload increase of 80% or more be handled within 720 seconds.

TABLE 1

| k | Demand Rise Fraction $g_k$ | $F^0_k$ (sec) |
| --- | --- | --- |
| 0 | 0% | 0 |
| 1 | 10% | 15 |
| 2 | 20% | 120 |
| 3 | 30% | 400 |
| 4 | 50% | 600 |
| 5 | 80% | 720 |
| 6 | ∞ | ∞ |

This second embodiment is identical to the first embodiment, except that in the second embodiment the method of the first embodiment is preceded by a first step of converting from the requirement expressed in terms of readiness $F^0$ to one expressed in terms of the readiness vector $R^O$. All subsequent steps are completely the same as in the first embodiment. Specifically, for each value k, an algorithm computes the minimal number of servers required to achieve an acceptable performance given the assumption that the demand is increased by a fraction $g_k$ above its present value. What constitutes acceptable performance depends on the nature of the application and the preferences of the administrator. One form of preference is to establish an upper limit on the CPU utilization permitted on a server, or among a set of servers; e.g., 80% or 90% may be used as values for this threshold. An alternative is to express preferences directly in terms of application metrics such as response time: for example, the administrator might specify that the response time for a given web application should not exceed two seconds for more than 5% of the requests. The algorithm that computes the minimal number of servers required to achieve the specified acceptable performance for a given assumed demand may, for example, comprise a queuing-theoretic algorithm coupled with an optimization algorithm. In one embodiment of the algorithm, a hypothetical workload intensity $\lambda_k$ is generated for each value of k by multiplying the current workload by $(1+g_k)$, where $g_k$ is the fraction of increase in workload intensity (e.g., see Table 1). The type of arrival process (e.g. Markov, Deterministic, or General) is either assumed, or estimated from measured arrival statistics. The service process type is likewise assumed or estimated from statistics. For each hypothetical workload intensity, a series of one or more hypothetical number of servers is assumed. A standard queuing theory formula or a numerical procedure (e.g. based on formulas and procedures from the queuing theory textbooks *Queuing Systems, Volume I and Queuing Systems, Volume II* by Leonard Kleinrock) is used to compute the estimated performance (i.e. an estimated response-time distribution, throughput, and/or average server utilization, depending on which is the performance metric of interest). An optimization algorithm (e.g. exhaustive search or binary search) examines the estimated performance measures produced by the queuing algorithm, and identifies for each assumed workload intensity $\lambda_k$ the minimal number of servers $s^*_k$ for which the computed performance lies within a range deemed acceptable by the administrator.

For example, suppose there is a supply of identical-capacity servers, and that the current workload can be satisfied with acceptable performance by 10 servers. Further consider that 10% additional workload can be accommodated with acceptable performance by one additional server, 20% additional workload can be accommodated by two additional servers, 30% additional workload can be accommodated by three additional servers, 50% additional workload can be accommodated by five additional servers, and 80% additional workload can be accommodated by eight additional servers. Then several components of the equivalent desired readiness vector $R^O$ are automatically identified from these results: namely, $R^O_1 = F^O_1$, $R^O_2 = F^O_2$, $R^O_3 = F^O_3$, $R^O_5 = F^O_4$, and $R^O_8 = F^O_5$. To obtain the readiness for 4 servers, $R^O_4$, one may make the pessimistic assumption that it is equal to that for 5 servers since it is not otherwise specified; hence $R^O_4 = F^O_4$. Similarly, the pessimistic assumption leads to $R^O_6 = F^O_5$ and $R^O_7 = F^O_5$. For a plurality of servers greater than 8, the fact that no readiness value exceeds 720 seconds may be used to infer that $R^O_k = F^O_5$ for k>5. Thus $R^O = (0, 15, 120, 400, 600, 600, 720, 720, 720)$ and $R^O_k = 720$ for k>8. Now, having derived the desired readiness vector, the remaining steps are exactly as described in the first embodiment.

Figure 6:
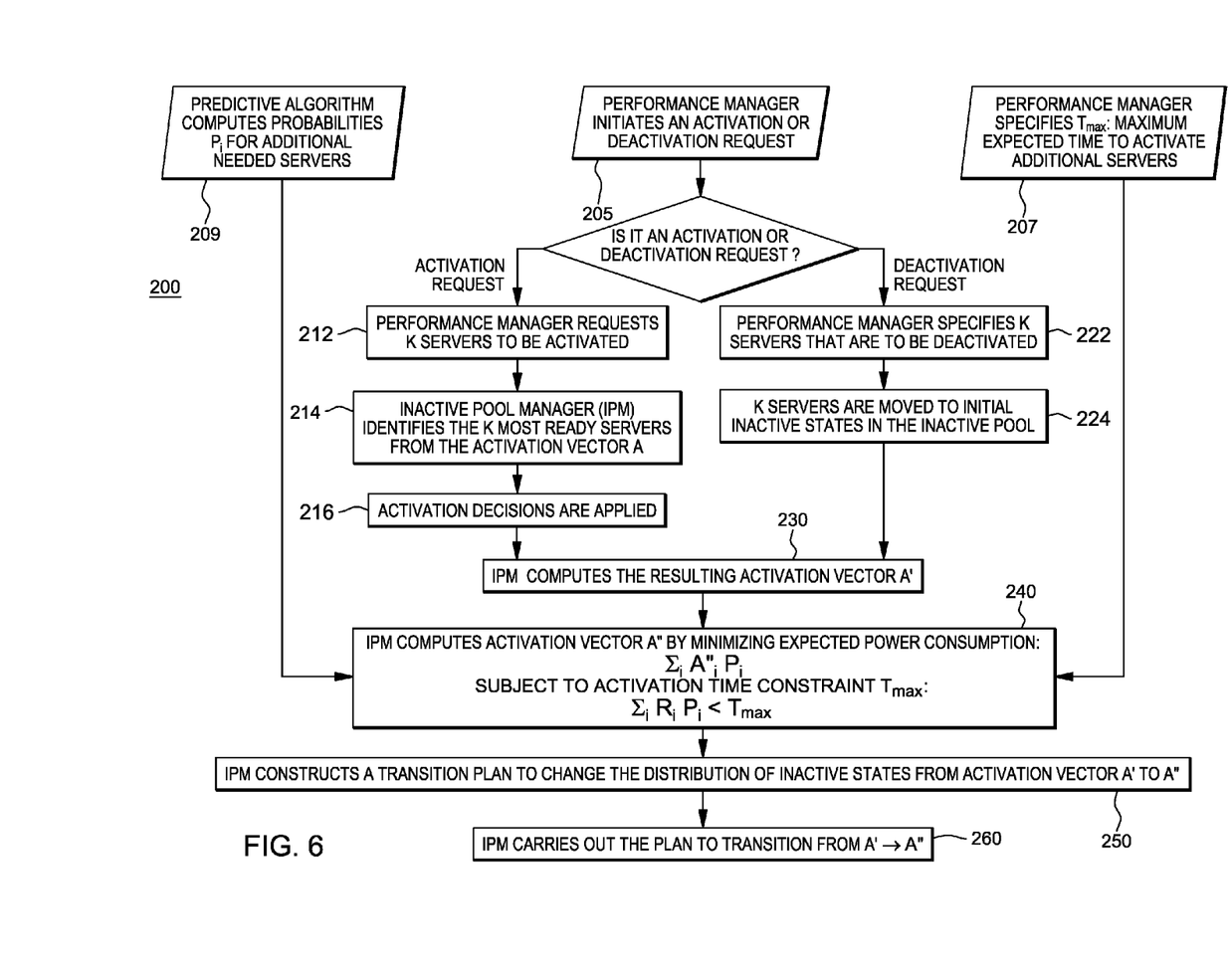
FIG. 6 depicts a method of managing the inactive server pool in a further embodiment.

In further alternate embodiments of the invention, the user can specify alternative measures of preferences in place of the aforementioned readiness vector $R^O$. For example, in a third embodiment, the steps are nearly the same as in the first embodiment represented in FIG. 5, except that the specified system goal (i.e., request) is different: it is to maintain the expected time to supply any additional servers required by the Global Pool manager below a specified upper threshold $T_{max}$. The steps of this third embodiment are depicted in FIG. 6. In this third embodiment, steps 205, 212, 214, 216, 222, 224 and 230 are exactly the same as their counterparts 105, 112, 114, 116, 122, 124 and 130 in FIG. 5. The differences from the first embodiment are as follows: First, at step 207 in FIG. 6, there is specified a value $T_{max}$, representing a maximum expected time to activate additional servers. Also, at step 209, a predictive algorithm computes probabilities pi for i additional servers to be needed the next time any additional servers are needed, where i runs from 1 to a specified upper threshold beyond which the probabilities are assumed to be zero. The predictive algorithm can be based on statistical or pattern-based predictors, or can employ other timeseries forecasting techniques such as linear regression, autoregressive moving average and neural networks (e.g., see Evelyn Duesterwald, Calin Cascaval, Sandhya Dwarkadas, "*Characterizing and Predicting Program Behavior and its Variability, Proceedings of the* 12*th International Conference on Parallel Architectures and Compilation Techniques*," p. 220, Sep. 27-Oct. 1, 2003; and, S. M. Kendall and J. K. Ord. Time Series. Oxford University Press, New York, third edition, 1990.] Step 240 is similar in nature to Step 140 in FIG. 5, except that the constraint optimization problem from which the desired activation vector A" is computed is different. At Step 240, A" is computed as the activation vector which minimizes the expected power consumption $\Sigma_i A''_i P_i$ given the constraint $\Sigma_i R_i p_i < T_{max}$, where, as before, the readiness R is computed from the activation vector A. The weighted sum $\Sigma_i R_i p_i$ represents the expected time required to make the required number of servers available. Once the desired activation vector is computed at Step 240, all subsequent steps are identical to those of the first embodiment, i.e. Steps 250 and 260 are identical to Steps 150 and 160 of FIG. 5.

Figure 4:
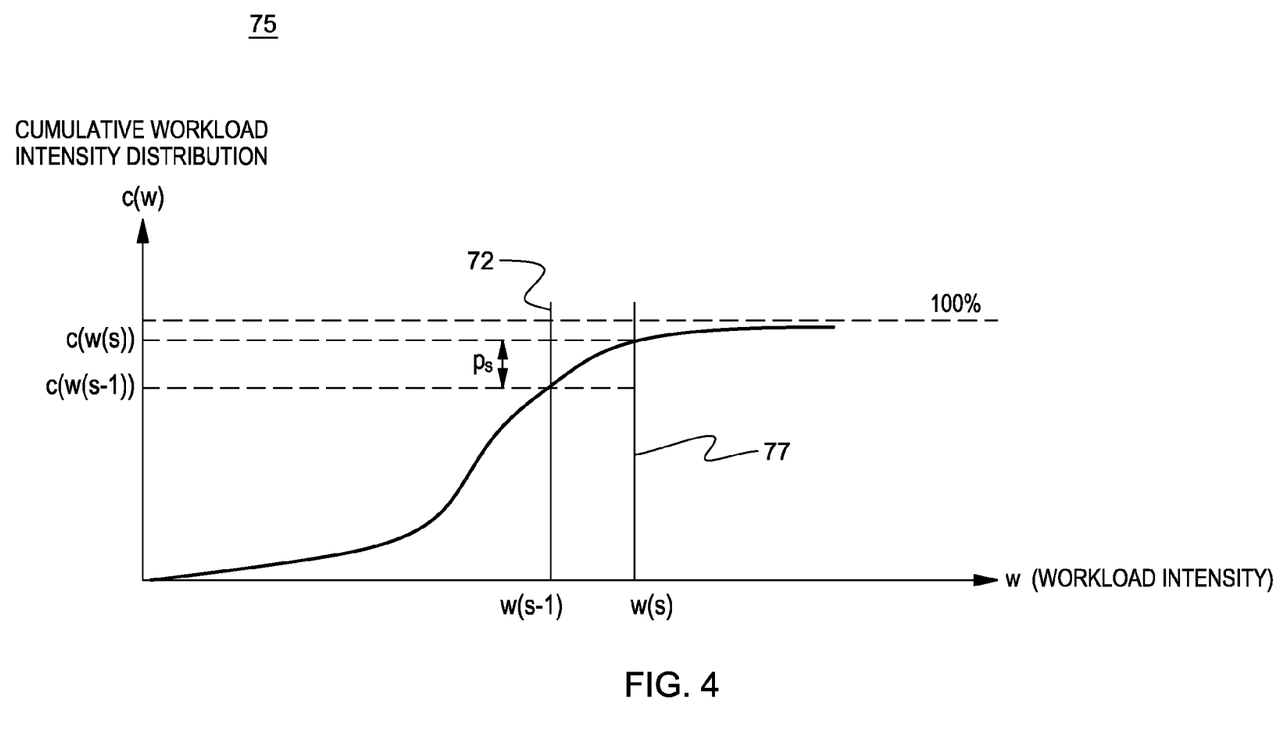
FIG. 4 shows an example of a demand distribution plot 75 of cluster-level demand based on an aggregation interval for workloads distributed over time.

In a preferred embodiment, the probabilities $p_s$ for "s" servers to be required for acceptable performance are computed as follows: Suppose c(w), the cumulative workload intensity distribution as a function of workload intensity "w", is known. Such a function c(w) is depicted for example in FIG. 4 which shows an example of a demand distribution plot 75 of cluster-level demand based on an aggregation interval for workloads distributed over time. For each integer value of the number of servers "s", an algorithm computes a maximal workload w(s) 77 for which "s" servers can attain a performance level that is deemed acceptable. The vertical bar, 77, in FIG. 4 shows an example to this attainable workload intensity level w(s), for the number of servers equal to "s". The corresponding cumulative distribution value, c(w(s)) denotes the probability that the observed cluster-level workload will be less than or equal to w(s). The algorithm for computing w(s) may be similar to that described herein above, which included computing the inverse function s(w). Specifically, the algorithm may comprise a queuing-theoretic algorithm that computes performance metrics as a function of an assumed workload and server capacity, coupled with an optimization algorithm (e.g., exhaustive search) that repeatedly runs the queuing-theoretic algorithm for multiple assumptions about the number workload to determine the maximal workload "w" that could be handled for a given number of servers "s" such that a given performance criterion is met. The probability $p_s$ for "s" servers to be required may be computed as $p_s = c(w(s)) - c(w(s-1))$. This probability is shown in FIG. 4, as the difference between the two cumulative density values $c(w(s))$ and $c(w(s-1))$ corresponding to the attainable workload intensity for s servers, shown as w(s) as indicated at vertical bar 77, and the attainable workload intensity for "s−1" servers, shown as w(s−1) as indicated at vertical bar 72, respectively.

In a fourth embodiment, the computation of the desired activation vector A" takes into consideration a further constraint, objective or tradeoff based on minimizing wear-and-tear on computing resources that can result from changing their activation state. For example, the nature of the constraint or objective could be such as to discourage or forbid the absolute total number of changes in activation state from exceeding a specified value. Alternatively, the constraint or objective could be constructed to discourage or forbid the number of changes in activation state within any given time period from exceeding a given upper limit. Alternatively, the constraint or objective might be based on the specific activation states and transitions among them, rather than just the total number or frequency of changes.

Figure 7:
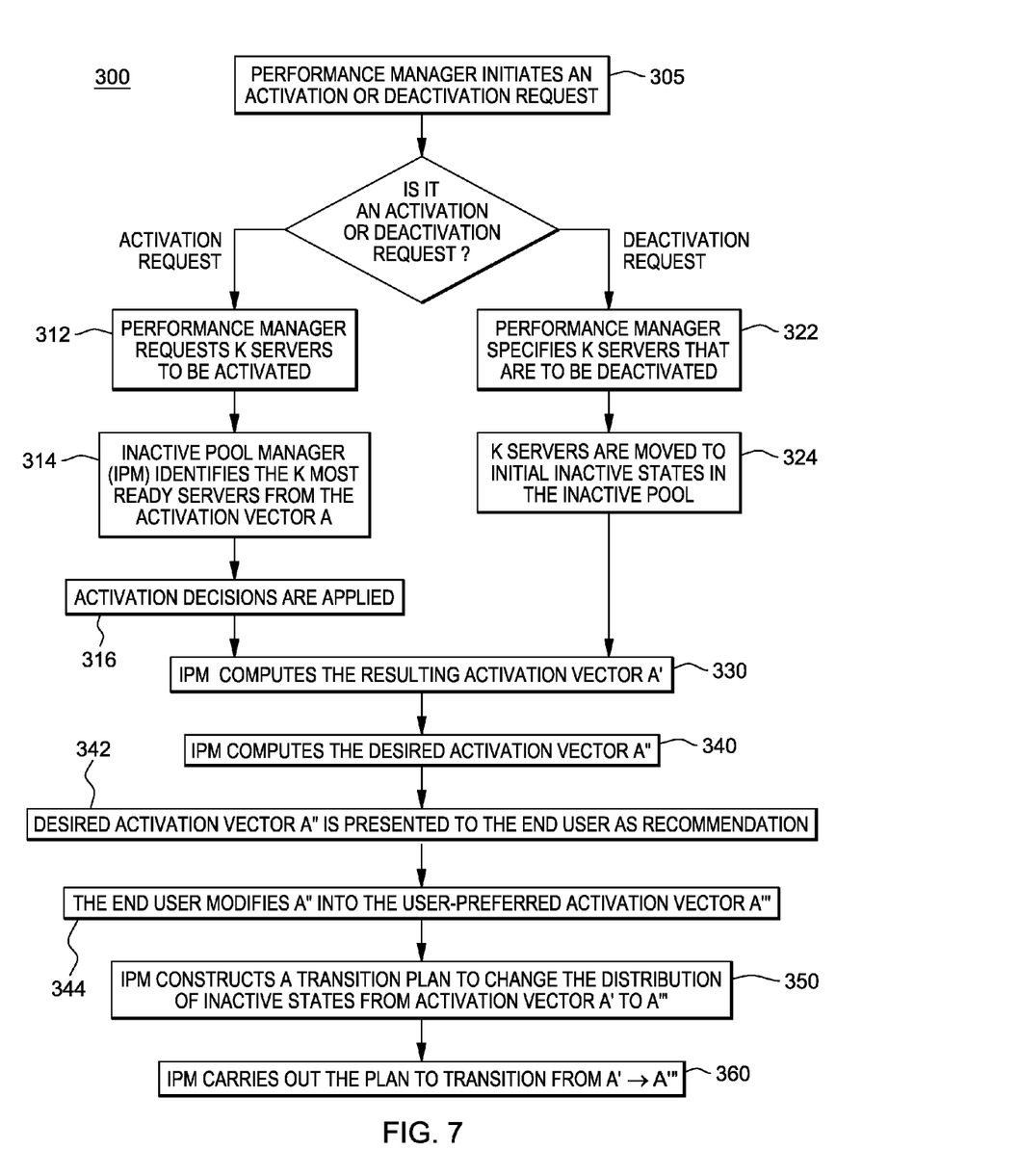
FIG. 7 depicts a method of managing the inactive server pool in an alternate embodiment.

In a fifth embodiment, shown in the flow chart of a method 300 in FIG. 7, wherein steps 305, 312, 314, 316, 322, 324 and 330 are exactly the same as their counterparts 105, 112, 114, 116, 122, 124 and 130 in FIG. 5. The differences from the first embodiment are as follows: the step 340 of computing a desired activation vector A" is followed by a step 342 in which a recommendation mode is employed. Here, the desired activation vector A" is presented to a human operator via a graphical user interface at 342, that permits the human operator to modify the desired activation vector into a user-preferred Activation Vector A"', e.g., as shown at 344. Then the new desired activation vector is input to the planner device at 350, a plan (sequence of actions) for moving the system to the new desired activation vector is generated, and then the plan is performed at 360.

Any of the above embodiments of the invention can be extended to include a Calibration Process that automatically establishes various quantities required for computing the optimal activation vector, such as the transition latency matrix and the power curves. The Calibration Process is triggered at the admission of a new computing resource to either of the pools. The calibration process works as follows: 1) A calibration utilization benchmark—similar in operational principle to SPECpower_ssj™ (trademark of the Standard Performance Evaluation Corporation: http://www.spec.org/power_ssj2008) incorporated by reference herein, that evaluates the power and performance characteristics of volume server class and multi-node class computers—is run at varying device utilizations and corresponding power utilization is monitored; idle device power is recorded; and, for available device power states: a) the device is cycled through each state; and, b) Transition latencies and power overhead, and power consumption at different states are recorded; and, based on the observed data, a "resource descriptor" is generated.

Figure 2:
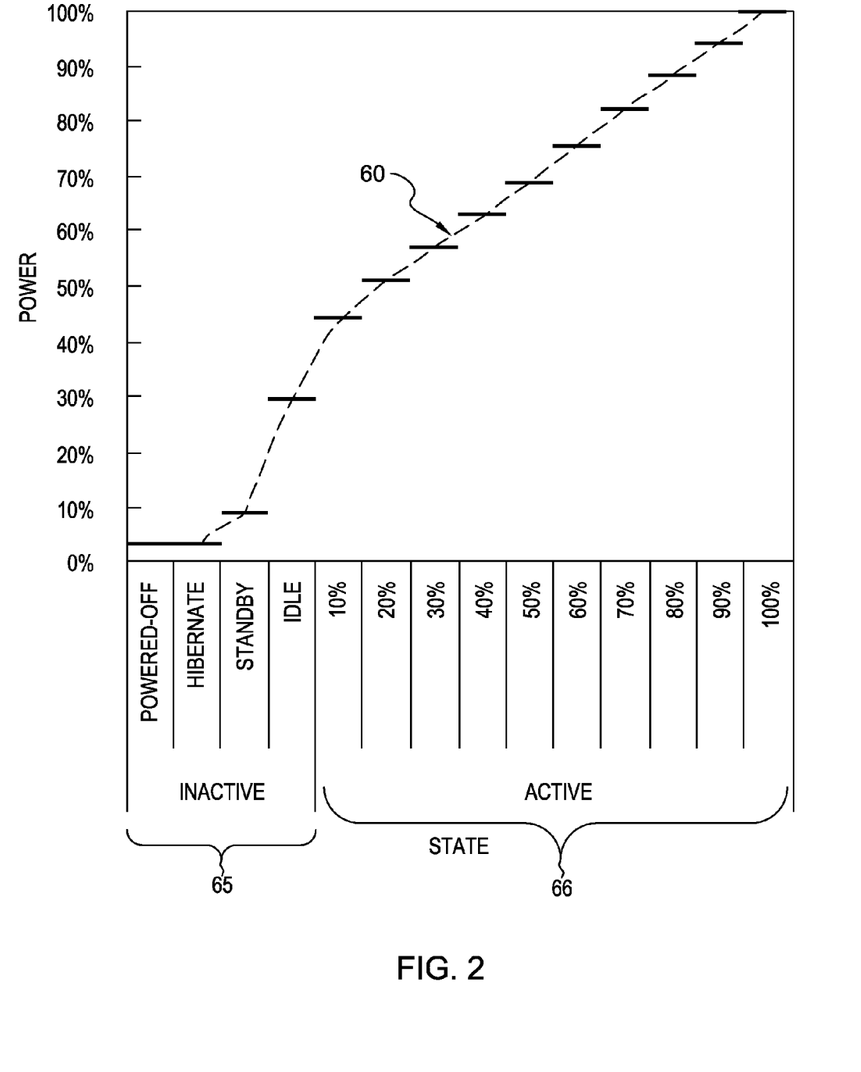
FIG. 2 depicts an overview of an example Resource power curve for the inactive and active states.
Figure 3B:
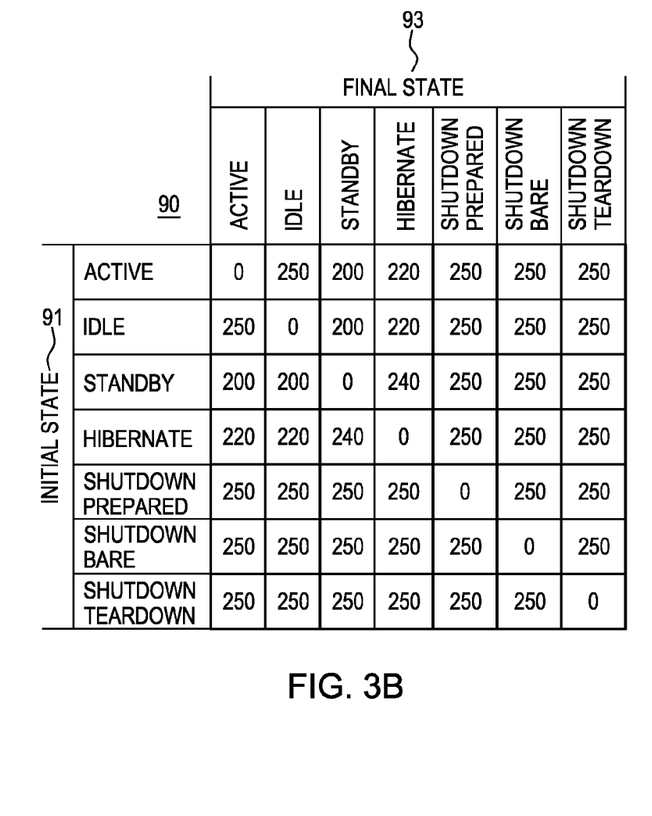

The end results of the calibration process are the generation of "resource descriptors" that include: (i) a transition latency matrix; (ii) a transition power matrix; and (iii) the resource power curve for each computing device. FIG. 3A and FIG. 3B, in one embodiment, and by non-limiting example, shows the example first two components of the resource descriptors computed as part of the calibration process. In FIG. 3, for example, the resource descriptors include data forming a Transition latency matrix 80 (shown in FIG. 3A) and, data forming a Transition power matrix 90 (shown in FIG. 3B) for a particular computing device being added to a pool. In one embodiment, the Transition latency matrix 80 shows latency times (e.g., in seconds) endured for rendering the device from a first particular state, e.g., an initial state 81, to a second particular state, e.g., a final state 83. Further, in one embodiment, the transition power matrix 90 shows power overhead consumed (e.g., in Watts) for rendering the device from a first particular power state, e.g., an initial state 91, to a second particular state, e.g., a final state 93. The energy overhead of each state transition is derived directly by multiplying the transition power and latency matrices. FIG. 2, in one embodiment, and by non-limiting example, shows the power curve component for one example computing device (e.g., server) being added to the pool. In FIG. 2, the example shows a resource power curve 60 for the inactive states 65 and active states 66.

The calibration process may be triggered at the admission of a new computing device to a pool. The full calibration process can be performed "eagerly" i.e., immediately after the device is added to the pool; or "lazily", based on performance requirements, available power budgets and energy costs. For example, the added resources might be immediately needed to satisfy current demand, or the time-varying energy costs and system load might make deferring calibration to a low-demand, low-cost time period preferable.

Data structures representing the resource descriptors are input into the pool managers to be used in host ordering for power-efficient transitioning among active and inactive states. Additional provision is made for allowing manual input in the decision regarding which devices are to be placed in which state.

As a result, the system, method and computer program product provides dynamic buffering in which servers are maintained in various states of readiness, and caused to make transitions among these states of readiness without consuming excessive amounts of energy. In one embodiment, transitions among these states of readiness are determined in such a way as to maintain good SLA behavior.

Figure 8:
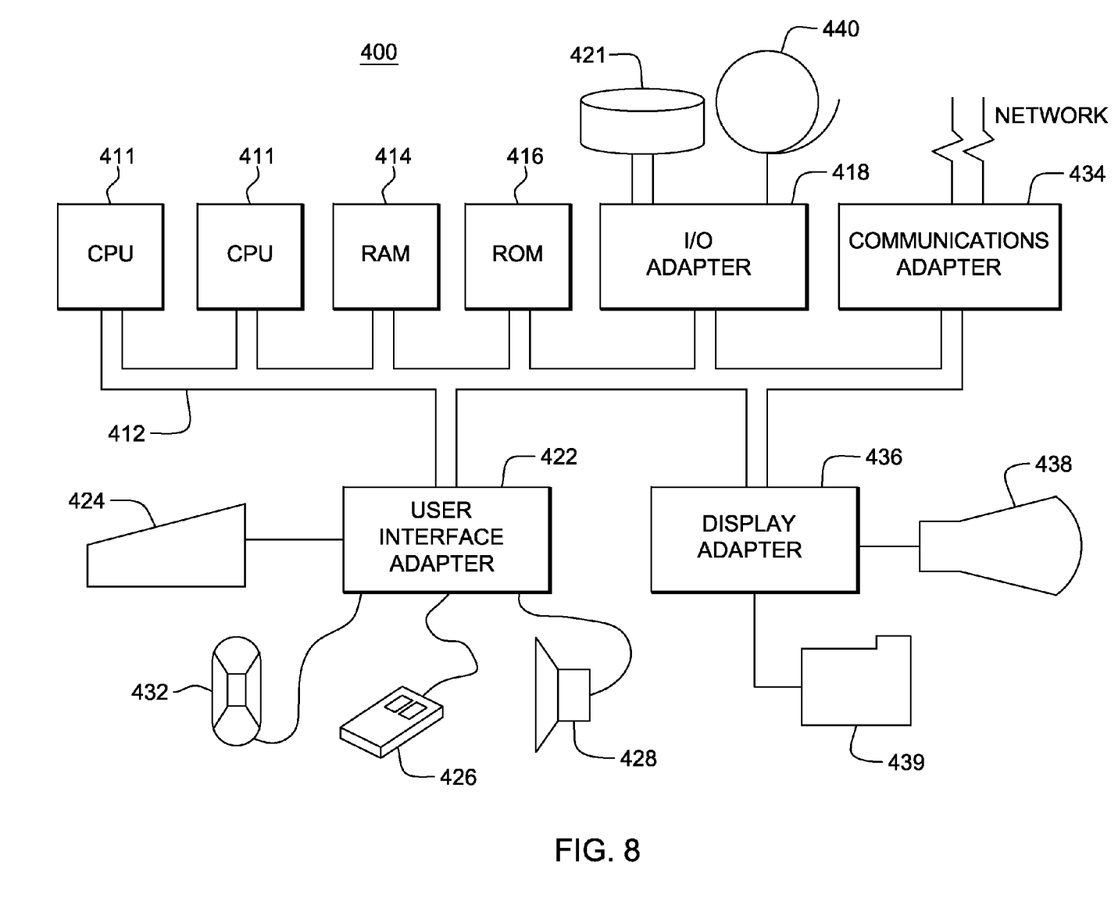
FIG. 8 illustrates an exemplary hardware configuration for implementing and solving a constraint optimization problem in one embodiment.

FIG. 8 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described our invention, what we claim as new, and desire to secure by Letters Patent is:

1. A system for managing inactive states of computing devices comprising:
  a memory,
  a processor unit in communication with said memory, for performing a method comprising:
    receiving, at said processor unit, a request to one of: activate or deactivate one or more computing devices from a respective group of inactive or active computing devices, each said inactive or active computing device initially in a pre-determined state of readiness;
    activating or deactivating said one or more computing devices, said activating or deactivating resulting in a number of computing devices in one or more activation states of readiness i;
    computing an optimal configuration of said computing devices in said one or more said states of readiness i by minimizing an expected power consumption $\Sigma_i A_i P_i$ where i represents all inactive computing device states, $A_i$ represents a number of said computing devices currently in each state i, and, $P_i$ represents an average power consumption of a computing devices while in said state i; and
    placing said computing devices in said optimized configuration, said processor unit is further configured to:
    formulate an objective function to be minimized, said objective function representing said expected power consumption $\Sigma_i A_i P_i$ subject to a constraint,
    wherein, after one of said activating or deactivating one or more computing devices, said processor unit is further configured to:
    compute a resulting activation vector A' representing said resulting number of computing devices in one or more activation states of readiness i, said optimizing including computing activation vector A" representing a number of computing devices in said optimized one or more activation states of readiness i;

wherein said objective function is subject to a constraint that $R_k \leq R^o_k$ for each computing devices k, wherein said R represents a readiness vector, a $k^{th}$ component $R_k$ representing a minimal amount of time fork computing devices to be restored to an active state given a specific activation vector A and a transition latency matrix T; and, $R^o$ represents a specified readiness vector, a $k^{th}$ component $R^o_k$ representing a specified constraint on a maximum time permitted for k inactive servers to be restored to said active state.

2. The system as claimed in claim 1, wherein said processor unit is further configured to:

initiate transition of said computing devices from one inactive state to another to reach a desired power state for each computing device, said processor unit generating a plan to minimize a time required to accomplish said transitioning from said activation vector A' to optimized activation vector A" according to a transition latency matrix $T_{ij}$, representing an expected time required to change an activation state of a computing device from activation state i to activation state j.

3. The system as claimed in claim 1, wherein said processor unit is further configured to:

specify a desired demand fluctuation response vector $F^o$ such that a $k^{th}$ component $F^o_k$ represents a maximum time permitted for a plurality of computing devices to be transitioned in anticipation of a workload intensity increase above a current level; and convert a requirement expressed in terms of said fluctuation response vector $F^o$ to said readiness vector $R^o$.

4. The system as claimed in claim 1, wherein said processor unit is further configured to:

specify an upper threshold $T_{max}$ representing a maximum expected time to activate additional computing devices; and compute probabilities $p_i$ for i additional computing devices to be needed, where i ranges from 1 to a specified upper threshold, wherein said activation vector A" is computed by formulating said objective function to minimize an expected power consumption $\Sigma_i A''_i P_i$ given a constraint $\Sigma_i R_i p_i < T_{max}$, where $\Sigma_i R_i p_i$ is a weighted sum representing the expected time required to make the i computing devices available.

5. The system as claimed in claim 1, wherein, after calculating said desired activation vector A", said processor unit is further configured to:

modify the desired activation vector into a user-preferred Activation Vector A'''; and input, to a planner device, a sequence of actions for transitioning the computing devices according to said user-preferred Activation Vector A'''.

6. The system as claimed in claim 1, wherein said processor unit is further configured to:

receive, at said processor unit, a request to de-activate one or more active computing devices; and placing said de-activated computing devices at a specified state of readiness, thereby, resulting in a new activation vector A';

solve a constraint optimization problem for computing a best activation vector A" from said activation state vector A';

generate a plan that minimizes a sequence of actions required to switch state of said computing devices from activation state A' to activation state A"; and execute the plan to bring said computing devices to said activation state A".

7. A computer program product for managing inactive states of computing devices, the computer program product comprising:

a non-transitory storage medium readable by a processing circuit and storing instructions for execution by the processing circuit for performing a method comprising:

receiving a request to one of: activate or deactivate one or more computing devices from a respective group of inactive or active computing devices, each said inactive or active computing device initially in a pre-determined state of readiness;

activating or deactivating said one or more computing devices, said activating or deactivating resulting in a number of computing devices in one or more states of readiness i;

computing an optimal configuration of said computing devices in said one or more said states of readiness i by minimizing an expected power consumption $\Sigma_i A_i P_i$ where i represents all inactive computing device states, $A_i$ represents a number of said computing devices currently in each state i, and, $P_i$ represents an average power consumption of a computing devices while in said state i; and placing said computing devices in said optimized configuration, and formulating an objective function to be minimized, said objective function representing said expected power consumption $\Sigma_i A_i P_i$ subject to a constraint, wherein, after one of said activating or deactivating one or more computing devices;

computing a resulting activation vector A' representing said resulting number of computing devices in one or more activation states of readiness i, said optimizing including computing activation vector A" representing a number of computing devices in said optimized one or more activation states of readiness i;

wherein said objective function is subject to a constraint that $R_k \leq R^o_k$ for each computing devices k, wherein said R represents a readiness vector, a $k^{th}$ component $R_k$ representing a minimal amount of time for k computing devices to be restored to an active state given a specific activation vector A and a transition latency matrix T; and, $R^o$ represents a specified readiness vector, a $k^{th}$ component $R^o_k$ representing a specified constraint on a maximum time permitted for k inactive servers to be restored to said active state.

8. The computer program product as claimed in claim 7, wherein said placing said computing devices in said optimized configuration comprises:

transitioning said computing devices from one inactive state to another to reach a desired power state for each computing device, said transitioning comprising:

generating a plan to minimize a time required to accomplish said transitioning from said activation vector A' to optimized activation vector A" according to a transition latency matrix $T_{ij}$, representing an expected time required to change an activation state of a computing device from activation state i to activation state.

9. The computer program product as claimed in claim 7, further comprising:

specifying a desired demand fluctuation response vector $F^o$ such that a $k^{th}$ component $F^o_k$ represents a maximum time permitted for a plurality of computing devices to be transitioned in anticipation of a workload intensity increase above a current level; and converting a requirement expressed in terms of said fluctuation response vector F0 to said readiness vector $R^O$.

10. The computer program product as claimed in claim 7, further comprising:
specifying an upper threshold $T_{max}$ representing a maximum expected time to activate additional computing devices; and
computing probabilities $p_i$ for i additional computing devices to be needed, where i ranges from 1 to a specified upper threshold, wherein said activation vector A" is computed by formulating said objective function to minimize an expected power consumption $\Sigma_i$ $A''_i$ $P_i$ given a constraint $\Sigma_i R_i$ $p_i < T_{max}$, where $\Sigma_i R_i p_i$ is a weighted sum representing the expected time required to make the i computing devices available.

11. The computer program product as claimed in claim 7, further comprising:
computing said probabilities $p_s$ for "s" computing devices by:
specifying c(w) that represents a cumulative workload intensity distribution as a function of a workload intensity "w";
computing a maximal workload intensity level w(s) for which "s" servers can attain a pre-determined performance level w(s);
computing a corresponding cumulative distribution value c(w(s)) to denote a probability that an observed cluster-level workload will be less than or equal to w(s); and
computing probability $p_s$ for "s" servers to be required according to:

$$p_s = c(w(s)) - c(w(s-1))$$

where cumulative density values c(w(s)) and c(w(s−1)) correspond respectively to attainable workload intensity for an amount s servers w(s) and the attainable workload intensity for an amount s−1 servers.

12. The computer program product as claimed in claim 7, wherein, after calculating said desired activation vector A",
modifying the desired activation vector into a user-preferred Activation Vector A'''; and
inputting, to a planner device, a sequence of actions for transitioning the computing devices according to said user-preferred Activation Vector A'''.

* * * * *